(12) United States Patent
Grossi et al.

(10) Patent No.: US 7,158,952 B1
(45) Date of Patent: Jan. 2, 2007

(54) SELF-SERVICE TERMINALS

(75) Inventors: Mark M. Grossi, Dundee (GB); Grant C. Paton, Dundee (GB); Kenneth A. Nicoll, Dundee (GB)

(73) Assignee: NCR Corporation, Dayton, OH (US)

(*) Notice: Subject to any disclaimer, the term of this patent is extended or adjusted under 35 U.S.C. 154(b) by 0 days.

(21) Appl. No.: 09/433,134

(22) Filed: Nov. 3, 1999

(30) Foreign Application Priority Data

Nov. 11, 1998 (GB) ................... 9824761.2

(51) Int. Cl.
*G06Q 40/00* (2006.01)

(52) U.S. Cl. .................... 705/43; 345/173; 235/379

(58) Field of Classification Search ............ 705/38–45; 902/8–41; 345/173
See application file for complete search history.

(56) References Cited

U.S. PATENT DOCUMENTS

| 4,438,326 A | | 3/1984 | Uchida | |
|---|---|---|---|---|
| 5,448,263 A | * | 9/1995 | Martin | 345/173 |
| 5,639,151 A | * | 6/1997 | McNelley et al. | 353/98 |
| 5,890,787 A | * | 4/1999 | McNelley et al. | 353/28 |
| 6,109,522 A | * | 8/2000 | Force et al. | 705/43 |

FOREIGN PATENT DOCUMENTS

| EP | 0284764 | | 10/1988 |
|---|---|---|---|
| EP | 0535417 | | 4/1993 |
| GB | 1486299 | | 9/1977 |
| GB | 2111808 | | 7/1983 |
| GB | 2245808 | | 1/1992 |
| GB | 0718 813 A2 | * | 6/1996 |
| JP | 9222954 | | 8/1997 |
| WO | 9409457 | | 4/1994 |

OTHER PUBLICATIONS

Pantagraph. New TV screens may carry U.S. label. Bloomington, Ill. May 8, 1994. p. E2. Retrieved from ProQuest Nov. 17, 2005. (3 pages).*

Business Wire. Projectavision's Solo-2 makes a shining impression on dealers nationwide; new enhancements to front projection unit raises picture quality. New York, Sep. 11, 1998. Retrieved from ProQuest Nov. 16, 2005. (3 pages).*

* cited by examiner

*Primary Examiner*—Hyung Sough
*Assistant Examiner*—Jennifer Liversedge
(74) *Attorney, Agent, or Firm*—Michael Chan

(57) ABSTRACT

A self-service terminal (SST), such as an ATM includes apparatus for producing images containing instructions for users of the terminal, and an arrangement for projecting the images onto a screen forming part of a terminal user interface.

14 Claims, 1 Drawing Sheet

SELF-SERVICE TERMINALS

BACKGROUND OF THE INVENTION

This invention relates to a self-service terminal (SST), such as automated teller machine (ATM) and in particular to an SST provided with an improved display.

Conventional self-service terminals (SSTs) such as automated teller machines (ATMs) interact with users via a user panel which conventionally includes a display screen, for displaying instructions, prompts and other outputs, and a keypad spaced from the screen and additional keys disposed to the sides of the screen for user inputs.

The screen may be a CRT, which is generally relatively heavy and bulky, or an LCD panel, which is more compact but relatively expensive. Further, to minimize expense and bulk, and also to accommodate the keypad and other user accessible features, such as a slot for a card reader, a cash dispense slot and a receipt printer slot, the screens tend to be relatively small, such that many users, particularly visually impaired users, may experience difficulties in using such machines. Also, for security reasons, the screen will normally be covered by relatively thick glass, and this may introduce parallax problems for users of different heights when the screen displays preset functions to be selected by pressing one of the keys disposed to the sides of the screen in alignment with a respective function.

SUMMARY OF THE INVENTION

It is among the objectives of embodiments of the invention to provide an SST with an improved display.

According to the present invention there is provided a self-service terminal (SST) comprising:

means for producing images containing instructions for users of the terminal;
means for projecting said images; and
display means for displaying said projected images.

According to another aspect of the present invention there is provided a method of operating a self-service terminal (SST), the method comprising:

producing images containing terminal operating instructions for users of the terminal;
projecting said images; and
displaying said projected images in front of a user location.

The use of the projected images permits a significant departure from existing SST configurations, in that images may be produced and projected from locations spaced from the display means. This contrasts with terminals utilizing CRTs or LCD screens, in which the means for generating the display images is conventionally located directly behind the display screen.

As used herein, the term "terminal operating instructions" is intended to encompass terminal outputs including instructions, prompts, and information relating to a transaction or operation, and also information which may be unrelated to a current transaction or operation, such as advertising material or images.

Preferably, the image producing means includes a suitably programmed computer or other device which may produce one or more of a plurality of pre-selected images, or which may generate one or more of a plurality of unique images. The images may be static or animated, and may comprise one or more of numerals, text or graphical images.

Preferably also, the display means includes a screen. The screen may be flat, or may take any suitable non-planar form; for example, by utilizing a mirrored concave screen it may be possible to produce real images in space. The screen may incorporate a keypad. Alternatively, or in addition, the screen may incorporate a touch sensitive surface. The function of individual keys or touch sensitive screen areas may be projected onto the screen and thus, operating in conjunction with processor means for controlling the terminal, the key functions may be varied as desired to suit a particular function, allowing greater flexibility in the operation of the terminal: for example in one mode keys may designate a natural sequence of numerals (0, 1, 2, 3 . . . 9), and in a subsequent mode may designate currency amounts (10, 20, 50, . . . 200), letters, symbols or cursor controls. The screen surface may also incorporate or encompass other functional elements, such as a card reader slot, a cash dispenser slot and receipt printer slot, and these elements may be highlighted at appropriate points during a transaction or operation, for example, by displaying an image of a hand pointing to the element or by differential lighting.

The area extent of screen displaying an image or instructions may be varied during the course of a transaction or operation, for example the extent of the displayed instructions may be reduced during a security sensitive part of a transaction, for example when the terminal is prompting the user to input their personal identification number (PIN) for user verification purposes, or displaying an account balance.

Further, a plurality of different image elements may be projected at any one time, for example a smaller area containing terminal operating instructions may be surrounded by images made up of a pattern of a financial institution's logos, or simply an attractive design or image.

Conveniently, the image projecting means is located above a user location and projects images onto display means in front of the user location. Such image projecting means may be incorporated into a roof structure extending over the user location. Of course, the image projection means may be positioned at other locations relative to the user location and display means, and a plurality of projection locations may be provided to, for example, minimize the possibility of a user's hand or head casting a shadow over the display means. The image projection means may also project images onto the display means via one or more mirrors, lenses or other optical devices.

BRIEF DESCRIPTION OF THE DRAWINGS

These and other aspects of the present invention will now be described, by way of example, with reference to the accompanying drawings, in which.

DETAILED DESCRIPTION

Figure 1:
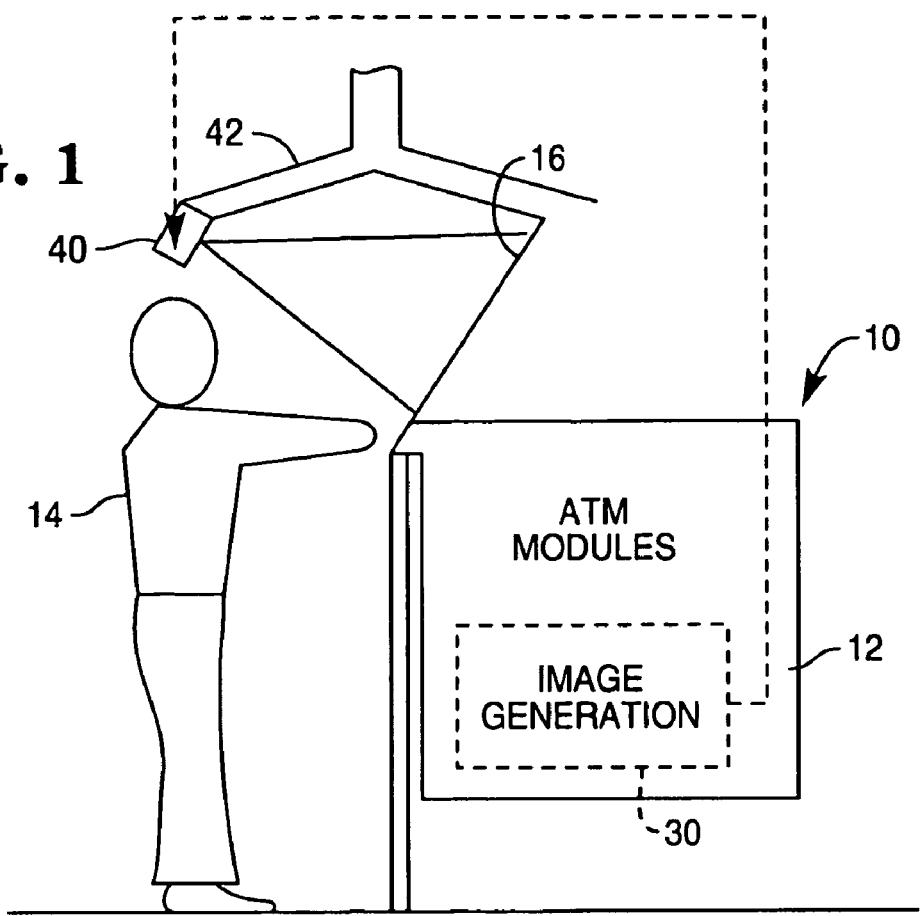
FIG. 1 is a diagrammatic representation of a self-service terminal in accordance with one embodiment of the present invention, in the form of an ATM.

Reference is first made to FIG. 1 of the drawings, which illustrates an SST in accordance with one embodiment of the present invention, in the form of an ATM 10. The ATM 10 includes a collection of substantially conventional ATM modules 12, as are currently commercially available, however the manner in which the ATM 10 displays information and instructions for the user 14 differs from a conventional ATM, as described below.

Figure 2:
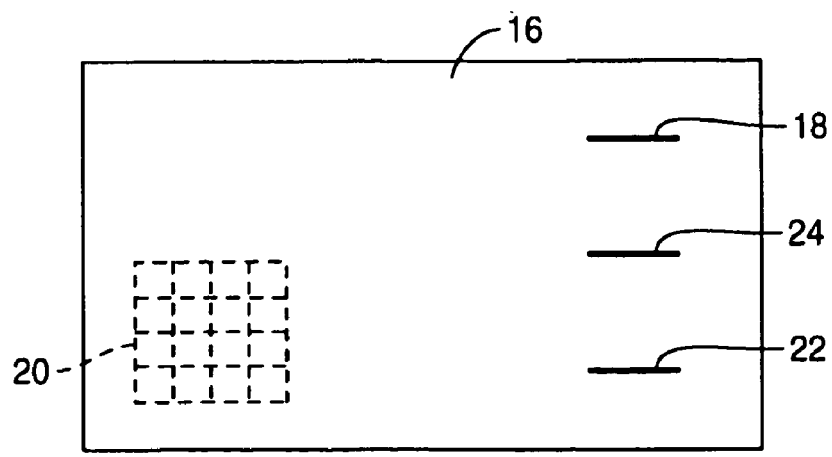
FIG. 2 is a view from above of a display screen of the terminal of FIG. 1.

Rather than the conventional interface means, comprising a user panel including, for example, a keypad and a relatively small CRT screen, the ATM 10 of this embodiment of the invention features a planar display screen 16 which incorporates all of the conventional user panel features within the screen 16. As may be seen from FIG. 2 of the drawings, the screen 16 incorporates a card reader slot 18, a keypad 20, a cash dispenser slot 22, and a receipt printer slot 24.

The image generation module 30 can be incorporated into the roof structure 42 extending over the user location.

The screen 16 itself is normally blank and carries no information or symbols; these are projected onto the screen 16 as required. Thus, initially the blank screen 16 may have projected thereon the message:

"Please insert card here", with a projected image of an arrow or pointing hand directing the user's attention to the card reader slot 18. The remainder of the screen 16 may be filled with any desired projected image or backdrop.

Once the user's identification card has been inserted in the slot 18, the screen image changes, with further instructions being displayed, for example:

"Please enter your personal identification number here", with a projected image of an arrow or pointing hand directed towards the keypad 20, on which are projected the appropriate numerals corresponding to the individual key functions.

In this manner the user is directed through a transaction with the projected image on the screen 16 changing as appropriate. The projected images may be static or animated, for example as the user is waiting for banknotes to be dispensed the screen 16 may carry an image of the appropriate banknotes being counted out, and when the banknotes are ready to be dispensed from the slot 22, the displayed image changes to highlight the slot 22, and carries an appropriate instruction, such as:

"Please take your money now", again possibly with an arrow or pointing hand directing the user to the location of the slot 22.

The projected image may extend over all or part of the screen, and where a particular feature, such as the keypad, is not in use, that feature may be obscured or carry an image unrelated to the function of the feature.

It will be apparent to those of skill in the art that the above-described embodiment allows provision of a self-service terminal without the requirement to incorporate a bulky and heavy CRT or an expensive LCD screen. Further, the use of projected images to provide interaction with the user provides for far greater flexibility in display presentation, the extent of the display no longer being limited to a relatively small screen, and potentially extending the display area to encompass the entire area of a user interface panel, and incorporating the other elements of the panel.

In other embodiments, the screen may incorporate touch sensitive areas, which are highlighted as appropriate during a transaction.

Also, certain embodiments may have an area for displaying images which is distinct and separate from other user panel features, such as one or more of the card reader slot, key pad, cash dispenser slot and receipt printer slot, however even in this configuration the present invention facilitates provision of a relatively large screen area.

What is claimed is:

1. A self-service terminal for a terminal user to conduct a self-service transaction, the self-service terminal comprising:

a first structure;

a second structure in the form of a roof structure extending over a terminal user location which is in front of the first structure;

a card reader disposed at the first structure and for receiving a user card from the terminal user;

an image generator for (i) producing a first image which contains first terminal operating instructions for the terminal user conducting the self-service transaction, and (ii) producing a second image which is different from the first image and which contains second terminal operating instructions for the terminal user conducting the self-service transaction;

a display screen disposed at the first structure and having a card reader slot opening formed therein and aligned with the card reader such that the card reader is able to receive a user card when the terminal user inserts the user card through the card reader slot opening; and a projector disposed at the roof structure and positioned relative to the display screen for (i) projecting the first image onto the display screen to direct the terminal user to location of the card reader slot opening formed in the display screen so that the terminal user can insert a user card through the card reader slot opening, and (ii) projecting the second image onto the display screen to direct the terminal user to a location which is other than the location of the card reader slot opening so that the terminal user can continue with next steps in conducting the self-service transaction.

2. A self-service terminal according to claim 1, further comprising a receipt printer disposed at the first structure and for printing a transaction receipt for the terminal user conducting the self-service transaction, and wherein the display screen has a receipt printer slot opening formed therein and aligned with the receipt printer such that the receipt printer is able to deliver a transaction receipt through the receipt printer slot opening to the terminal user upon completion of the self-service transaction.

3. A self-service terminal according to claim 1, wherein the image generator is disposed at the roof structure.

4. An automated teller machine (ATM) for an ATM customer to conduct an ATM transaction, the ATM comprising:

a first structure;

a second structure in the form of a roof structure extending over an ATM customer location which is in front of the first structure;

a keypad disposed at the first structure and for allowing the ATM customer to enter transaction data for conducting the ATM transaction;

a cash dispenser disposed at the first structure and for dispensing cash to the ATM customer conducting the ATM transaction;

an image generator for producing first and second images containing instructions for the ATM customer to conduct the ATM transaction;

a display screen disposed at the first structure and having a first area in which the keypad is located and a second area in which a cash dispenser slot opening is formed therein and aligned with the cash dispenser such that the cash dispenser is able to dispense cash through the cash dispenser slot opening to the ATM customer during the ATM transaction; and a projector disposed at the roof structure and positioned relative to the display screen for (i) projecting the first image onto the display screen to direct the ATM customer to the keypad so that the ATM customer can enter transaction data for conducting the ATM transaction, and (ii) projecting the second image onto the display screen to direct the ATM customer to the cash dispenser slot opening formed in the display screen so that the ATM customer can collect cash when the cash dispenser dispenses cash through the cash dispenser slot opening to the ATM customer.

5. An ATM according to claim 4, further comprising a card reader disposed at the first structure and for receiving an ATM customer card from the ATM customer, and wherein the display screen has a card reader slot opening formed therein and aligned with the card reader such that the card reader is able to receive an ATM customer card when the ATM customer inserts the ATM customer card through the card reader slot opening.

6. An ATM according to claim 5, further comprising a receipt printer disposed at the first structure and for printing an ATM transaction receipt for the ATM customer conducting the ATM transaction, and wherein the display screen has a receipt printer slot opening formed therein and aligned with the receipt printer such that the receipt printer is able to deliver a printed ATM transaction receipt through the receipt printer slot opening to the ATM customer upon completion of the ATM transaction.

7. An ATM according to claim 4, wherein the image generator is disposed at the roof structure.

8. A method of operating a self-service terminal, the method comprising:
    producing a first image which contains terminal user operating instructions for a terminal user conducting a self-service transaction at the self-service terminal;
    projecting the first image onto a first area of a display screen in which a first slot opening is formed to direct the terminal user in locating the first slot opening;
    producing a second image which is different from the first image and which contains terminal user operating instructions for the terminal user conducting the self-service transaction at the self-service terminal;
    receiving a first item which has been inserted through the first slot opening by the terminal user; and
    projecting the second image onto a second area of the display screen in which a second slot opening is formed to direct the terminal user in locating the second slot opening after the first item has been inserted by the terminal user through the first slot opening formed in the display screen; and
    dispensing a second item through the second slot opening to deliver the second item to the terminal user.

9. A method according to claim 8, wherein each of the first and second images comprises an animated image.

10. A method according to claim 9, wherein the first area of the display screen is adjacent to the first slot opening and is highlighted at appropriate times while the self-service transaction is being conducted by the terminal user.

11. A method according to claim 10, wherein the second area of the display screen is adjacent to the second slot opening and is highlighted at appropriate times while the self-service transaction is being conducted by the terminal user.

12. A method of operating an automated teller machine (ATM), the method comprising:
    producing a first image which contains ATM operating instructions for an ATM customer conducting an ATM transaction at the ATM;
    projecting the first image onto a first area of the display screen in which an ATM card reader slot opening is formed to direct the ATM customer in locating the ATM card reader slot opening;
    producing a second image which is different from the first image and which contains ATM operating instructions for the ATM customer conducting the ATM transaction at the ATM;
    receiving an ATM customer card which has been inserted through the ATM card reader slot opening by the ATM customer; and
    projecting the second image onto the second area of the display screen in response to receiving the ATM customer card through the ATM card reader slot opening formed in the display screen to direct the ATM customer in locating a device in the vicinity of the second area of the display screen so that the ATM customer can continue with next steps in completing the ATM transaction at the ATM.

13. A method according to claim 12, wherein each of the first and second images comprises an animated image.

14. A method according to claim 13, wherein the first area of the display screen is adjacent to the ATM card reader slot opening and is highlighted at appropriate times while the ATM transaction is being conducted by the ATM customer.

* * * * *